(12) United States Patent
Tanaka et al.

(10) Patent No.: US 6,669,371 B2
(45) Date of Patent: Dec. 30, 2003

(54) OIL-IMPREGNATED SINTERED BEARING

(75) Inventors: Takeshi Tanaka, Toyohashi (JP); Kenji Nishio, Toyohashi (JP); Tooru Ito, Hamana-gun (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/846,612

(22) Filed: May 2, 2001

(65) Prior Publication Data

US 2002/0001420 A1 Jan. 3, 2002

(30) Foreign Application Priority Data

May 19, 2000 (JP) ........................................ 2000-147754

(51) Int. Cl.[7] .............................................. F16C 17/02
(52) U.S. Cl. ...................................... 384/279; 384/286
(58) Field of Search ................................. 384/279, 286, 384/902, 297, 300, 909

(56) References Cited

U.S. PATENT DOCUMENTS 5,282,688 A    2/1994   Kanezaki et al.

FOREIGN PATENT DOCUMENTS

JP    Y2-46-32487    11/1971
JP    B2-2685333     8/1997

*Primary Examiner*—Lenard A. Footland
(74) *Attorney, Agent, or Firm*—Posz & Bethards, PLC

(57) ABSTRACT

An oil-impregnated sintered bearing is comprised of a cylindrical porous bearing body and a non-porous resinous slide member. The bearing body has a first portion providing a part of the slide surface of the bearing and a second portion having an inner periphery. The non-porous resinous slide member is disposed at the inner periphery of the second portion providing the other part of the slide surface. The slide member has a radial thickness that corresponds to a suitable ratio of the radial thickness of the bearing.

20 Claims, 7 Drawing Sheets

OIL-IMPREGNATED SINTERED BEARING

CROSS REFERENCE TO RELATED APPLICATION

The present application is based on and claims priority from Japanese Patent Application Hei 2000-147754 filed May 18, 2000, the contents of which are incorporated herein by reference.

BACKGROUND OF THE INVENTION

1. Field of the Invention

The present invention relates to an oil-impregnated sintered bearing that has a non-porous slide member.

2. Description of the Related Art

Usually, an oil-impregnated sintered bearing is apt to be short of an oil film formed between a rotating shaft of a device and the slide surface of bearing when load applied to the shaft increases to a certain level. Shortage of the oil film may lower not only the performance of the device but also the lifetime thereof.

JP-Y2-46-32487 discloses a bearing in which an abrasion resistant resin is impregnated into the inner peripheral portion of a porous metal body member to form a non-porous slide surface.

However, there is a big difference (e.g. as big as 10 times) in the coefficient of thermal expansion between such an abrasion resistant resin and the metal body member. If such a bearing is used at a temperature that is lower than the temperature when the resin was impregnated, the impregnated abrasion-resistant resin contracts. This reduces the inside diameter of the slide surface and, consequently, the clearance between the slide surface and the shaft. As a result, the shaft can not rotate smoothly, and the lifetime of the bearing may shorten.

JP-B2-2685333 discloses a bearing, in which a non-porous metal member is inserted into a cylindrical sintered bearing body to form a slide surface. Although there is a small difference in the coefficient of thermal expansion between the shaft and the slide surface, there is a considerable friction resistance between the two members because of a metal-to-metal contact when an oil film is not formed under a low temperature. This friction also reduces the rotation efficiency and the lifetime of the bearing.

SUMMARY OF THE INVENTION

Therefore, a main object of the invention is to provide an improved oil-impregnated sintered bearing that has a long lifetime and high rotation efficiency.

An oil-impregnated sintered bearing according to an embodiment of the invention includes a cylindrical porous bearing body having a first portion providing a part of the slide surface and a second portion having an inner periphery and a non-porous slide member disposed at the inner periphery of the second portion providing the other part of the slide surface. The slide member has a radial thickness of about 20% of the radial thickness of said bearing.

The slide member can be formed by a resinous material that is impregnated into the second portion of the bearing body. Therefore, the slide member is securely fixed to the bearing body and will not peel off.

On the other hand, the second portion of the bearing body can provide a recess in which the slide member is fixedly disposed. Because the bonding force is comparatively weaker, the inside diameter of the bearing is not affected by the contraction of the slide member under a low temperature.

The slide surface of the bearing can include a cylindrical middle slide surface and cylindrical axial end surfaces gradually expanding in opposite directions as the end surfaces leave from the middle surface. Even if a shaft inserted into the bearing is inclined relative to the axis of the bearing, the shaft can be properly supported by one of the end surfaces, thereby increasing the lifetime of the bearing.

Preferably, the bearing body has a mark for indicating the slide member.

It is also preferable that the slide member is made of fluororesin. However, the slide member can include graphite and/or molybdenum powder.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A small motor equipped with a speed reduction mechanism according to a first embodiment of the invention is described with reference to FIGS. 1–8.

Figure 1:
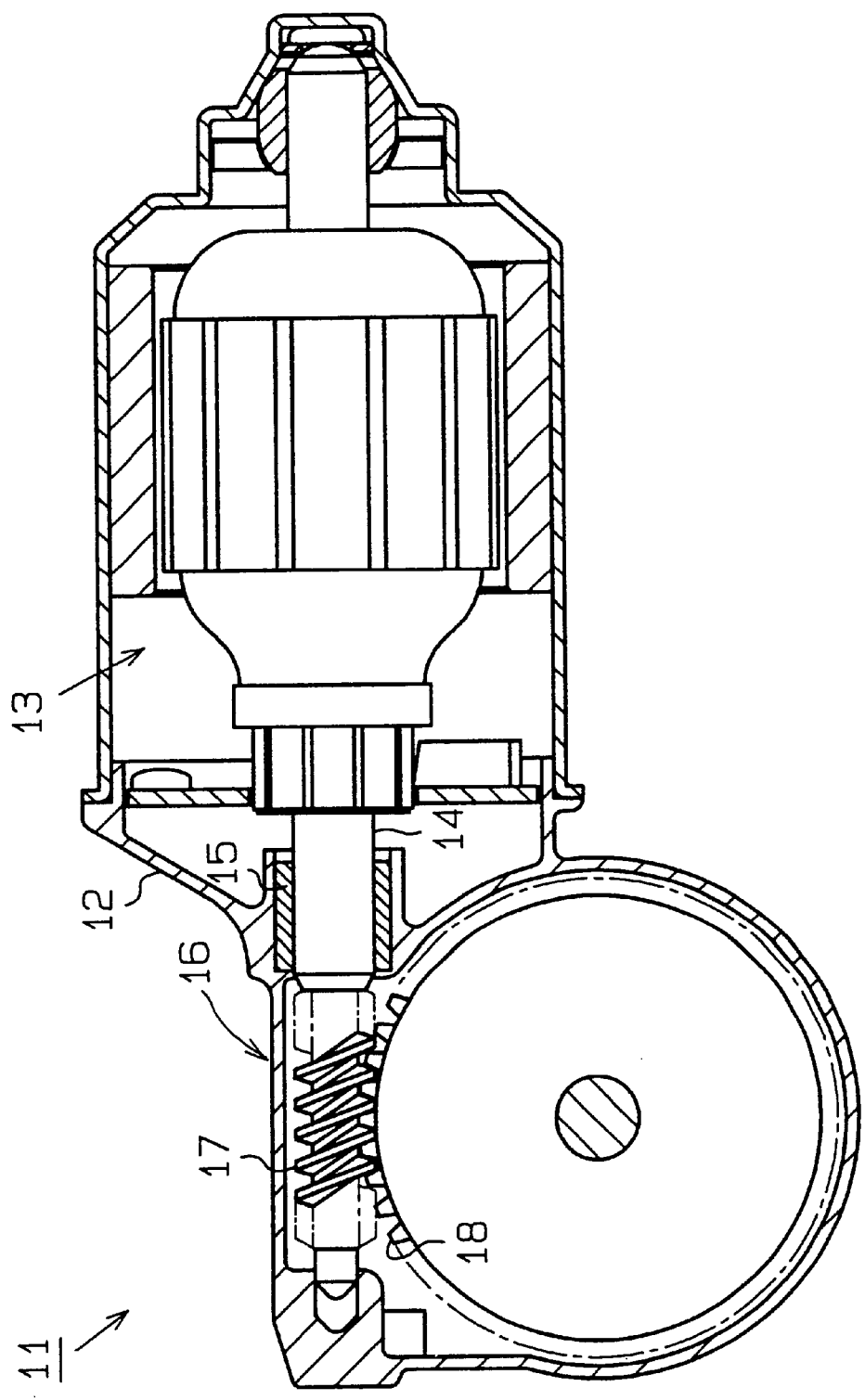
Fig. 1 is a schematic cross-sectional side view of a motor that has an oil-impregnated sintered bearing according to a first embodiment of the invention.

As shown in FIG. 1, the small motor 11 is comprised of a housing 12, a motor section 13 having a metal shaft 14 and a speed reduction section 16 including a worm 17 and a worm wheel 18. The metal shaft 14 is supported by a bearing 15, which is inserted into a cavity 15 of the housing 12. The shaft 14 is connected to the worm 17 at the left end thereof. The worm 17 engages the worm wheel 18 in a well-known manner. When the motor section 13 rotates, the worm wheel 18 rotates at a speed lower than the motor section 13.

Figure 2:
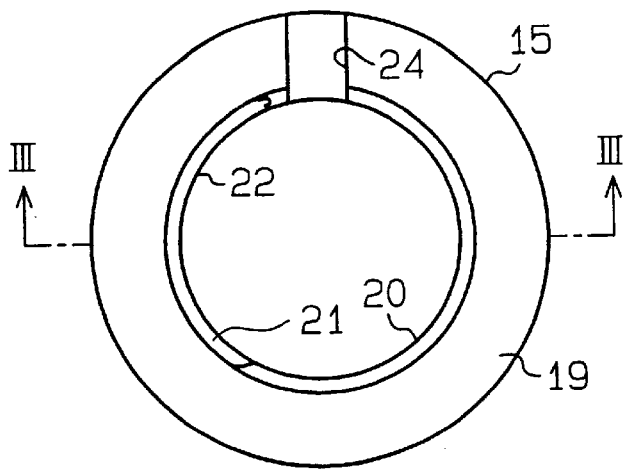
FIG. 2 is a schematic front view of the bearing according to the first embodiment.
Figure 3:
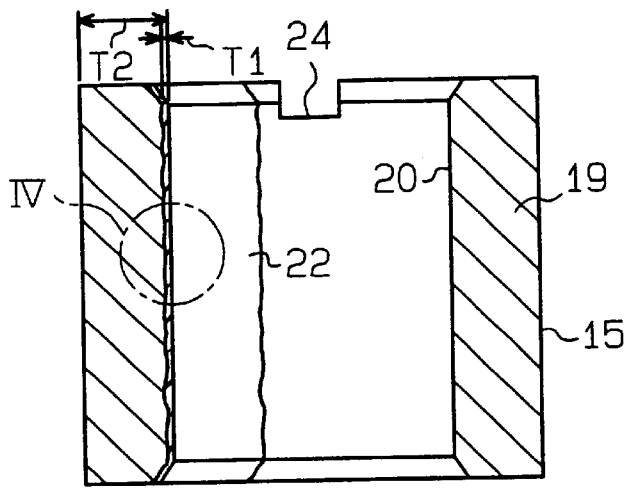
FIG. 3 is a cross-sectional view of the bearing shown in FIG. 2 cut along line III—III; 33
Figure 4:
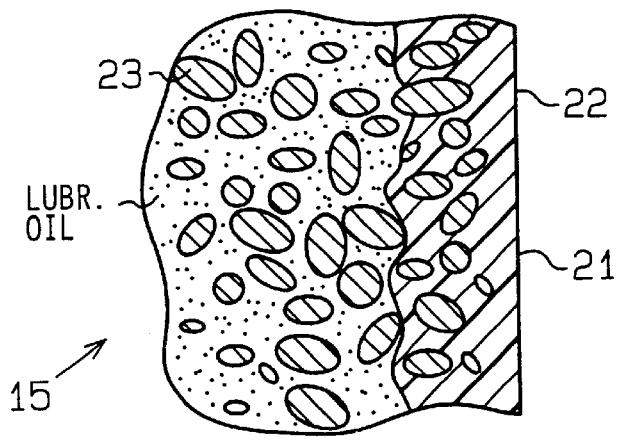
FIG. 4 is an enlarged schematic view of a portion IV of the bearing shown in FIG. 3.

The bearing 15, as shown in FIGS. 2 and 3, is comprised of a cylindrical porous bearing body 19 made of sintered cupper powder and a non-porous slide member 21 made of fluororesin. The slide member 21 can include abrasion-proof material, such as graphite or molybdenum powder. The bearing body 19 can be made of a porous ceramic material. The slide member 21 is disposed on a portion of the inner periphery 20 of the bearing body 19 to form a second slide surface 22 adjacent the other portion of the inner periphery 20 that forms a first slide surface. The second slide surface extends over the axial length of the bearing 15, so that the shaft 14 can be supported by the slide surface even if the shaft 14 inclines relative to the bearing 15. As shown in FIG. 4, the bearing body 19 is comprised of cupper-based metal particles or powders 23, and the slide member 21 is formed from a resinous material that is impregnated into spaces or gaps formed between the powders 23. Thus, the slide member 21 is formed in an inner peripheral portion of the bearing to cover metal powders 23 and, therefore, will not peel off. The radial thickness T1 of the slide member 21 is about 20% of the total radial thickness T2 of the bearing 15. Lubrication oil is contained in the spaces between the powders 23 at the first slide surface or the bare inner periphery of the bearing body that the slide member 21 does not cover.

As shown in FIGS. 2 and 3, the bearing 15 has a slit 24 at an end thereof. The slit 24 is formed at a circumferential side of the slide member 21 to provide a mark for indicating the slide member 21 when the bearing 15 is fixed to the housing 12. Two or more slits 24 can be formed according to circumstances. The slit 24 may be substituted by a projection.

Figure 5:
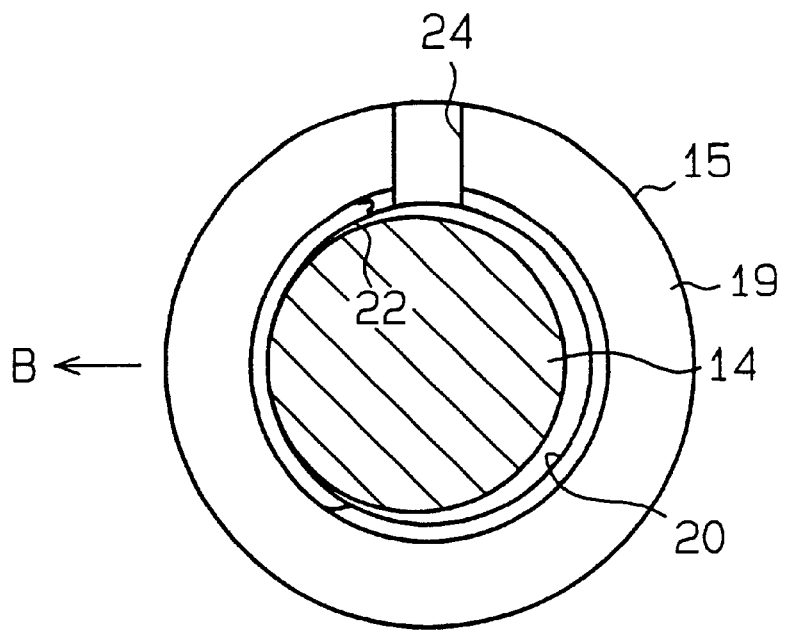
FIG. 5 is an explanatory diagram of the bearing according to the first embodiment.
Figure 6:
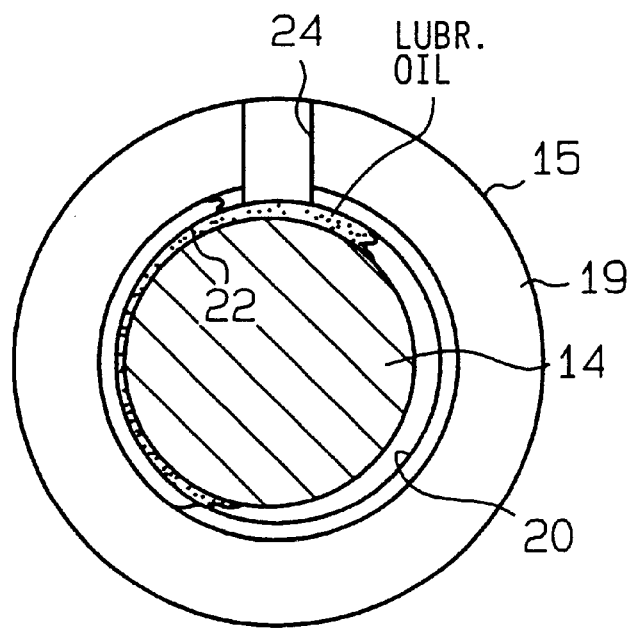
FIG. 6 is an explanatory diagram of the bearing according to the first embodiment.

As shown in FIG. 5, a transversal force is applied to the bearing 15 in a direction B from the worm wheel 18. If the shaft 14 stands still for a long time, the lubrication oil dries out, and the shaft 14 directly contacts the slide member 21. When the motor 13 rotates the shaft 14, the shaft 14 rubs and heats the slide member 21, which, subsequently heats the second slide surface or the bear inner periphery of the bearing body 19 adjacent the slide member 21. As a result, the lubrication oil oozes out from the gaps between the powders 23 and gets into the clearance between the second slide surface 22 on the slide member 21 and shaft 14, as shown in FIG. 6.

Figure 7:
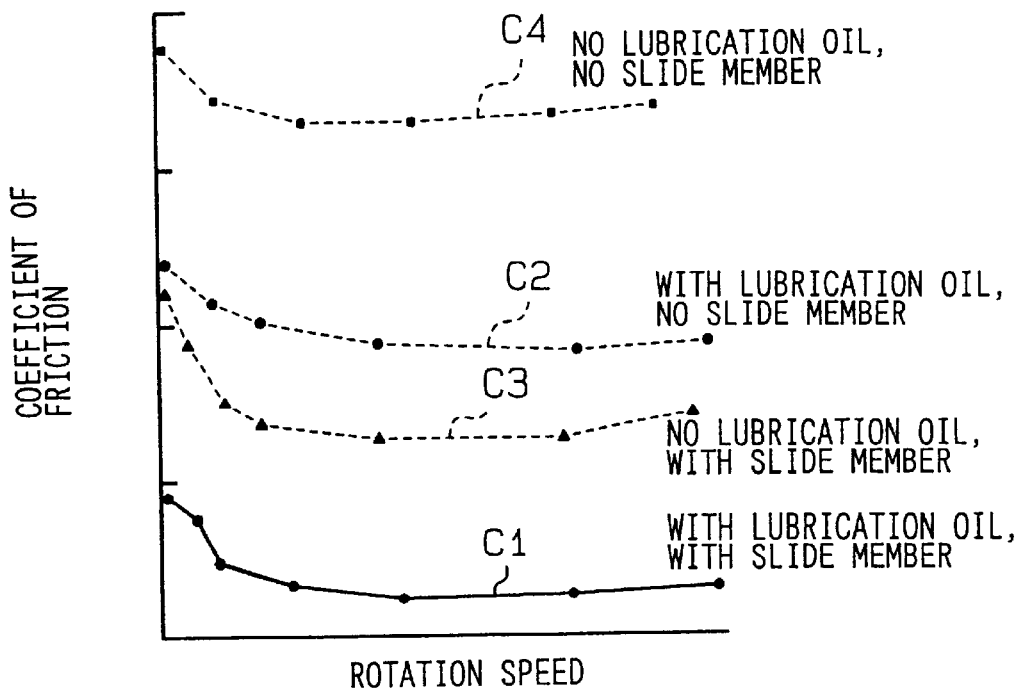
FIG. 7 is a graph showing characteristic curves of coefficients of the friction of the bearing relative to rotation speeds of a shaft under various conditions.

As indicated by a curve C1 in FIG. 7, the bearing according to the first embodiment provides the lowest coefficient of the friction over the entire rotation speed in practical use. In the meantime, a curve C2 represents the relationship between coefficients of the friction of a bearing that has an oil-contained bearing body and no slide member and rotation speeds of the shaft, a curve C3 represents the relationship between coefficients of the friction of a bearing that has a bearing body containing no oil and a slide member and rotation speeds of the shaft, and a curve C4 represents the relationship between coefficients of the friction of a bearing that has a bearing body having no oil and no slide member and rotation speeds of the shaft.

Figure 8:
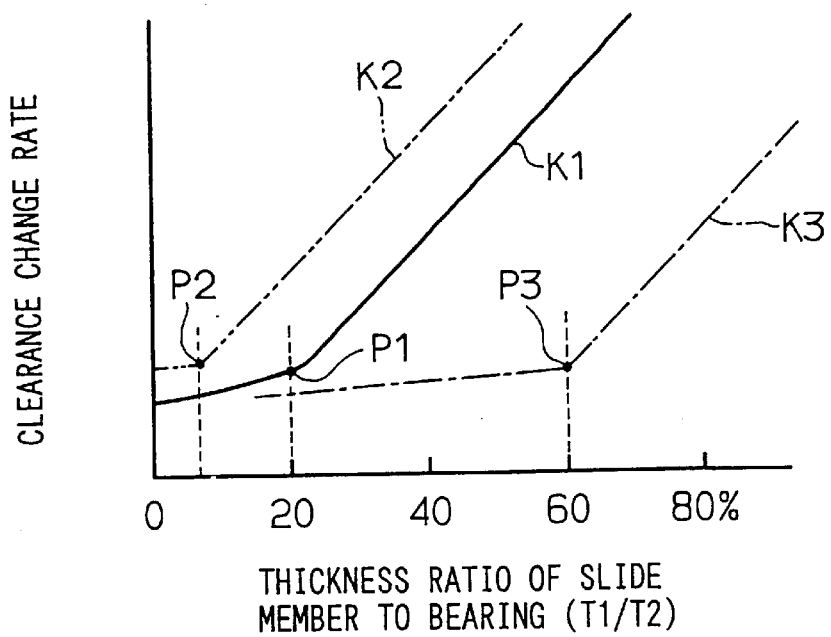
FIG. 8 is a graph showing a characteristic curve of change rate of the clearances formed between the bearing and the shaft relative to ratios of thickness T1 of a slide member T1 and thickness T2 of a bearing.

It has been found that the clearance change rate changes moderately as temperature of the bearing changes if the ratio of the thickness of the slide member 21 to the total thickness of the bearing is less than about 20%, which corresponds to an inflection point of the characteristic curve of the clearance change rate, as indicated by a clearance-change-rate characteristic curve shown in FIG. 8. In other words, the clearance between the slide member 21 and the shaft 14 stays within a practically permissible operation level if the ratio of the thickness of the slide member 21 to the thickness of the bearing changes is lower than a certain level that corresponds to an inflection point of the clearance-change-rate characteristic curve that is a function of the ratio of the thickness of the slide member 21 to the total thickness of the bearing 15.

Figure 9:
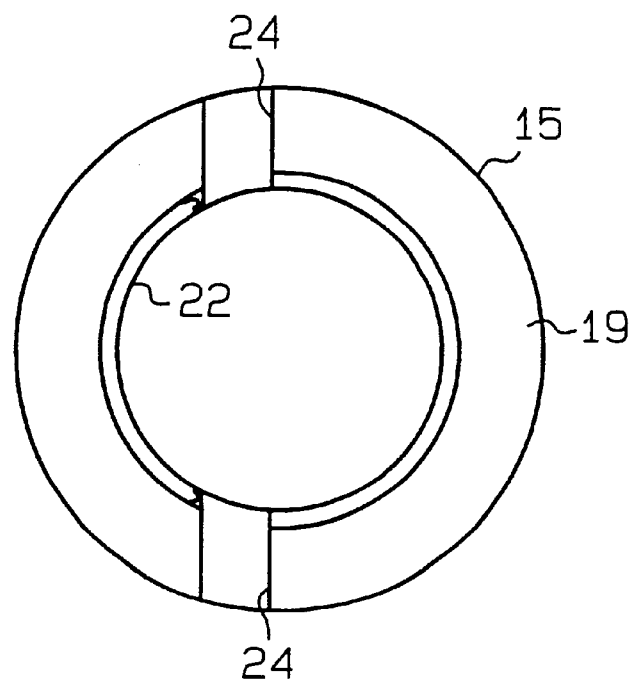
FIG. 9 is a schematic front view of a bearing according to a second embodiment of the invention.

A bearing according to a second embodiment of the invention is described with reference to FIG. 9. A pair of slits 24 is formed respectively at portions of the bearing body 19 adjacent to opposite circumferential ends of the slide member 21. Each slit 24 extends in a direction off to the radial direction. Therefore, the slide member 21 can be easily identified, and the lubrication oil may cling to the surfaces of the slits 24 and does not directly fly off from the slits 24. Since the surfaces of the slits 24 are porous, the lubrication oil that clings to the surfaces can be retrieved to the bearing body 19.

Figure 10:
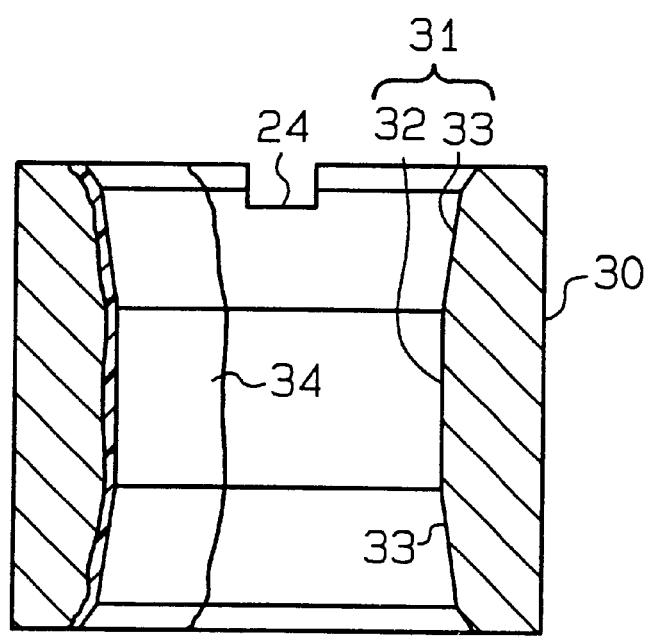
FIG. 10 is a schematic cross-sectional side view of the bearing according to a third embodiment of the invention.
Figure 11:
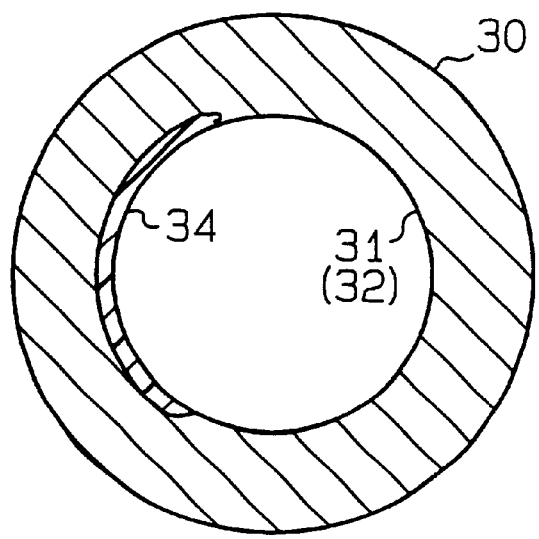
FIG. 11 is a cross-sectional front view of the bearing according to the third embodiment.

A bearing according to a third embodiment of the invention is described with reference to FIGS. 10 and 11.

The inner periphery 31 of a bearing 30 is comprised of a cylindrical middle surface 32 and tapering end surfaces 33 radial direction. Therefore, the slide member 21 can be easily identified, and the lubrication oil may cling to the surfaces of the slits 24 and does not directly fly off from the slits 24. Since the surfaces of the slits 24 are porous, the lubrication oil that clings to the surfaces can be retrieved to the bearing body 19.

A bearing according to a third embodiment of the invention is described with reference to FIGS. 10 and 11.

The inner periphery 31 of a bearing 30 is comprised of a cylindrical middle surface 32 and tapering end surfaces 33 that gradually expand as the end surfaces 33 leave from the middle surface 32. A non-porous slide member 34 made of an abrasion-proof material is formed to extend over the length of the inner periphery 31 to cover a portion of the middle surface 32 and the end surfaces 33. Even if a shaft inserted into the bearing 30 is inclined relative to the axis of the bearing 30, the shaft can be properly supported by one of the end surfaces 33, thereby increasing the lifetime of the bearing 30.

Figure 12:
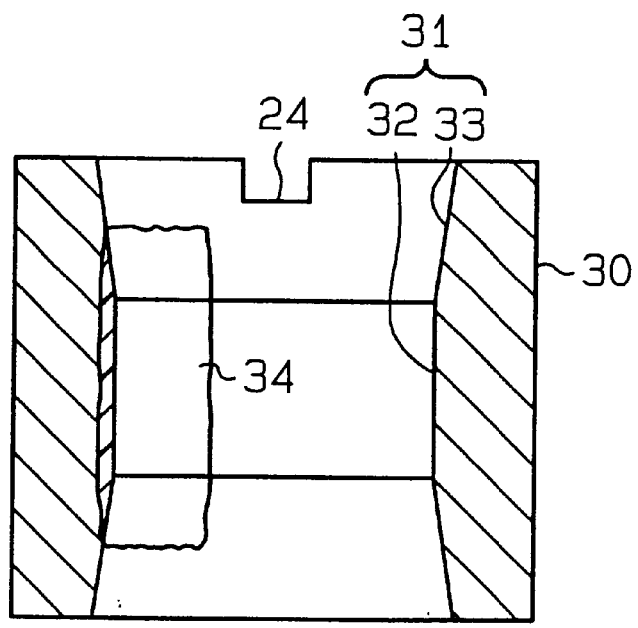
FIG. 12 is a schematic cross-sectional side view of a bearing according to a variation of the third embodiment of the invention.

The slide member 34 can be disposed to extend a part of the length of the inner periphery if the slide member 34 covers the whole length of the middle surface, as shown in FIG. 12.

Figure 13:
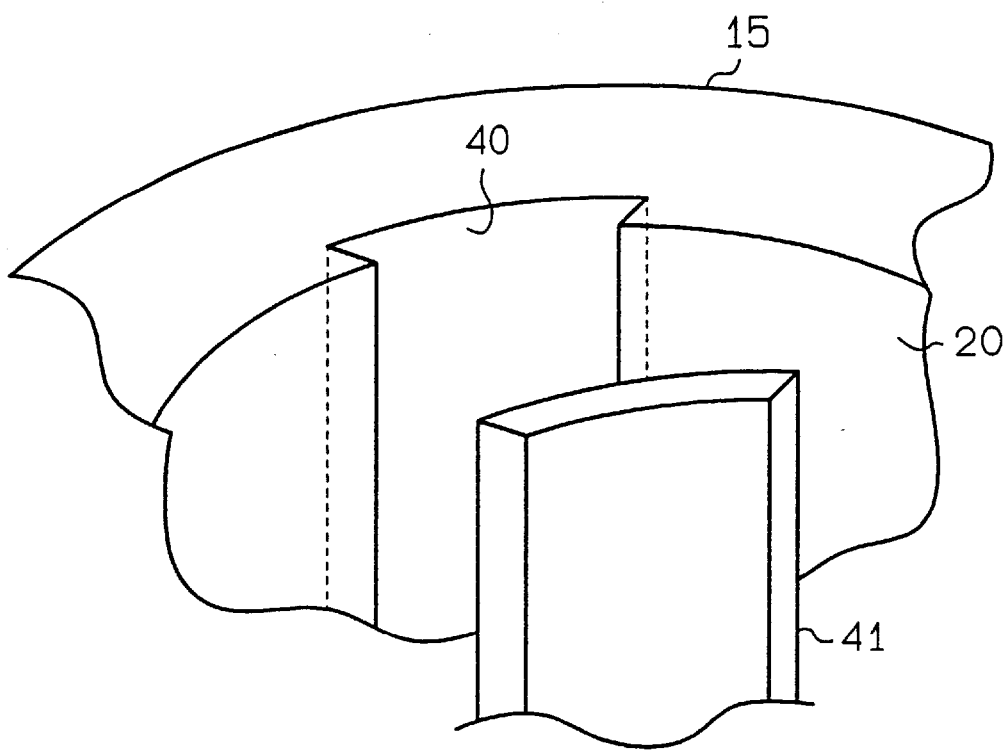
FIG. 13 is an enlarged schematic perspective view of a portion of a bearing according to a fourth embodiment of the invention.
Figure 14:
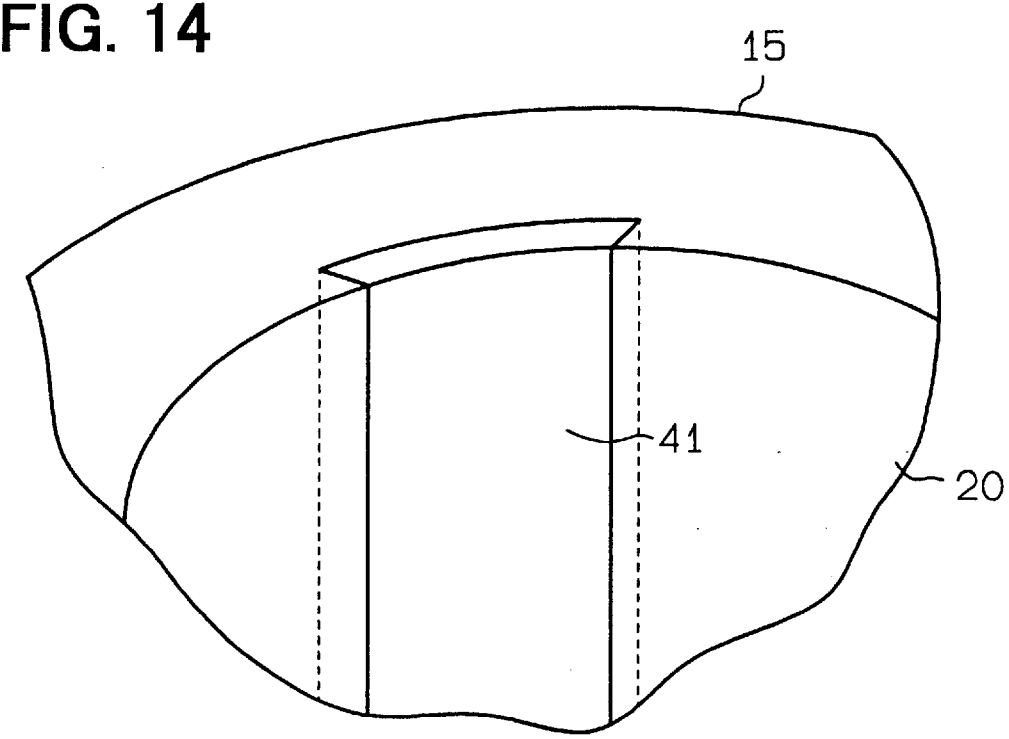
FIG. 14 is an enlarged schematic perspective view of a portion of the bearing according to the fourth embodiment of the invention.

A bearing according to a fourth embodiment of the invention is described with reference to FIGS. 13 and 14. A non-porous slide member 41 made of an abrasion-proof material can be disposed in a recess 40 formed at a portion of the inner periphery 20 of the bearing 15. The recess 40 and also the slide member 41 have a wider circumferential width at the bottom (radial outside) than the width at the opening (radial inside). That is, the slide member 41 has a generally trapezoidal cross-section, as shown in FIG. 13 and the same axial length as the bearing 15. The slide member 41 can be fitted to the recess with or without heating.

Because the bonding force of the bearing body 19 is comparatively weaker than that of the embodiments described above, the inside diameter of the bearing 15 is not affected by the contraction of the slide member 41 under a low temperature. Accordingly, the clearance between the shaft and the bearing 15 can be maintained in a permissible range even if the bearing 15 is operated under usual operation conditions.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A cylindrical oil-impregnated sintered bearing having a radial thickness T2 and an inner slide surface, said bearing comprising:

a cylindrical porous bearing body made of sintered metal powder, said bearing body having a first portion providing a part of said slide surface and a second portion having an inner periphery, said first portion having the same radial thickness as said bearing; and a non-porous slide member having a thickness T1 disposed at said inner periphery of said second portion for providing the other part of said slide surface, said slide member being made of a resinous material whose clearance changes under a constant temperature change along a non-linear curve having an inflection point that is a function of a ratio T1/T2 of said radial thickness T1 of said slide member to said radial thickness T2 of said bearing changes, wherein said thickness T1 of said slide member is smaller than a thickness that corresponds to a ratio T1/T2 of said inflection point.

2. The bearing as claimed in claim 1, wherein
   said slide member is formed by a fluororesin that is impregnated into said second portion of said bearing body.

3. The bearing as claimed in claim 1, wherein said second portion of said bearing body has a recess, and said slide member is fixedly disposed in said recess.

4. The bearing as claimed in claim 1, wherein
   said slide member extends over a whole axial length of said bearing.

5. The bearing as claimed in claim 1, wherein
   said slide surface comprises a cylindrical middle slide surface and cylindrical axial end surfaces gradually expanding in opposite directions as said end surfaces leave from said middle surface.

6. The bearing as claimed in claim 1, wherein said bearing body has a mark for indicating said slide member at an axial end thereof.

7. The bearing as claimed in claim 1, wherein said slide member is made of fluororesin.

8. The bearing as claimed in claim 7, wherein said ratio is less than 20%.

9. The bearing as claimed in claim 7, wherein said slide member includes one of graphite powder and molybdenum powder.

10. The bearing as claimed in claim 1, wherein said slide member is made of polypropylene.

11. The bearing as claimed in claim 10, wherein said ratio is less than 10%.

12. The bearing as claimed in claim 1, wherein said slide member is made of nylon.

13. The bearing as claimed in claim 12, wherein said ratiois less than 60%.

14. An oil-impregnated sintered bearing for supporting a shaft at a clearance from an inner cylindrical slide surface, said bearing comprising:

a cylindrical porous bearing body having a first portion providing a part of said slide surface and a second portion having an inner periphery, said first portion having the same radial thickness as said bearing; and a non-porous resinous slide member made of a resinous material disposed at said inner periphery of said second portion providing the other part of said slide surface, wherein a ratio of the radial thickness of said slide member to the radial thickness of said bearing is smaller than a ratio that corresponds to an inflection point of a clearance-change-rate characteristic curve that is a function of said ratio.

15. The bearing as claimed in claim 14, wherein
    said slide member is made of fluororesin.

16. The bearing as claimed in claim 15, wherein
    said slide member has a radial thickness of about 20% of said radial thickness of said bearing.

17. The bearing as claimed in claim 14, wherein
    said slide member is made of polypropylene.

18. The bearing as claimed in claim 17, wherein said slide member has a radial thickness of about 10% of said radial thickness of said bearing.

19. The bearing as claimed in claim 17, wherein
    said slide member has a radial thickness of about 60% of said radial thickness of said bearing.

20. The bearing as claimed in claim 14, wherein
    said slide member is made of nylon.

* * * * *